(12) United States Patent
Nakata

(10) Patent No.: US 8,341,654 B2
(45) Date of Patent: Dec. 25, 2012

(54) OPTICAL DISC APPARATUS

(75) Inventor: Shinichi Nakata, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 118 days.

(21) Appl. No.: 13/035,453

(22) Filed: Feb. 25, 2011

(65) Prior Publication Data

US 2011/0214134 A1 Sep. 1, 2011

(30) Foreign Application Priority Data

Feb. 25, 2010 (JP) .................. 2010-040094

(51) Int. Cl.
*G11B 17/04* (2006.01)
(52) U.S. Cl. ....................... 720/620; 369/204
(58) Field of Classification Search .................. 369/204; 720/620, 622, 626
See application file for complete search history.

(56) References Cited

U.S. PATENT DOCUMENTS

| | | | | |
|---|---|---|---|---|
| 5,163,040 | A * | 11/1992 | Hake | 369/204 |
| 6,873,481 | B2 * | 3/2005 | Ohyama et al. | 369/30.85 |
| 7,302,694 | B2 * | 11/2007 | Kikkoji | 720/621 |
| 7,793,313 | B2 * | 9/2010 | Hasegawa et al. | 720/621 |
| 2009/0193449 | A1 | 7/2009 | Ito et al. | |

FOREIGN PATENT DOCUMENTS

| | | |
|---|---|---|
| JP | 03-280264 | 12/1991 |
| JP | 2007-334953 | 12/2007 |

* cited by examiner

*Primary Examiner* — Angel A. Castro
(74) *Attorney, Agent, or Firm* — McDermott Will & Emery LLP

(57) ABSTRACT

A control unit makes the slot control mechanism execute an failure recovery operation to repeat the insertion operation and the ejection operation alternately for a predetermined amount at a first point of time when the below fact is found, if it is found that there is an error in insertion operation or ejection operation of a slot control mechanism. Afterwards, the control unit makes the slot control mechanism execute an restoration operation for a predetermined amount after a second point of time when the below fact is found, if it is found that the slot control mechanism has returned to normal, thereby making the slot control mechanism return to the state at the first point of time. Then, the control unit makes the slot control mechanism execute the insertion operation or the ejection operation again. With this arrangement, it is possible to ensure reliable insertion operation or ejection operation.

5 Claims, 9 Drawing Sheets

OPTICAL DISC APPARATUS

CROSS REFERENCES

This application relates to and claims priority from Japanese Patent Application No. 2010-040094, filed on Feb. 25, 2010, the entire disclosure of which is incorporated herein by reference.

BACKGROUND

The present invention relates to an optical disc apparatus. Particularly, the invention is suited for use in an optical disc apparatus relating to a technique for loading a disc tray, on which an optical disc is placed, into an optical disc apparatus housing or unloading the disc tray from the optical disc apparatus.

DESCRIPTION OF RELATED ART

A conventional optical disc apparatus (such as an information recording reproduction device) is configured so that an information recording medium such as an optical disc is loaded or ejected by driving a loading motor. A conventional information recording reproduction device is equipped with an extrusion sensor as an ejection detecting means for detecting the existence of the optical disc and an insertion sensor as a loading detecting means at an optical disc ejection completed position and loading completed position. The conventional information recording reproduction device is configured so that if the insertion operation of the optical disc cannot be completed within a predetermined amount of time, the conventional information recording reproduction device prompts the optical disc to be moved in an ejection direction by repeating normal rotation and reverse rotation of the loading motor (see Japanese Patent Laid-Open (Kokai) Application Publication No. H3-280264 (FIG. 2)).

As another configuration, there is a slot-in type disc device. If a control circuit built in a conventional slot-in type disc device cannot receive an ejection completion signal even after the elapse of a specified period of time since the start of the ejection operation, it determines that an error in the ejection operation has occurred, and then performs switch-back control. For this switch-back control, the control circuit attempts to avoid the above-mentioned ejection operation error by switching a rotation direction of the loading motor between an insertion direction and an ejection direction (See Japanese Patent Laid-Open (Kokai) Application Publication No. 2007-334953 (FIG. 11)).

SUMMARY

However, if the above-mentioned conventional information recording reproduction device or slot-in type disc device (both of the devices will be hereinafter collectively referred to as the "conventional optical disc apparatus") has an error in the ejection operation, the ejection operation may sometimes fail to return to normal even by repeatedly changing the rotation direction of the loading motor. In this case, the conventional optical disc apparatus cannot eject the optical disc itself unless, for example, the device itself is taken apart. Therefore, reliable ejection of the optical disc cannot be secured.

The present invention was devised in light of the above circumstances and aims at suggesting an optical disc apparatus that can secure reliable insertion operation or ejection operation.

In order to solve the above problems, an optical disc apparatus for performing at least either reading or writing of data from or to an optical disc is provided according to an aspect of the present invention, wherein the optical disc apparatus includes: a housing; a slot control mechanism for executing an insertion operation to place the optical disc from an outside to an inside of the housing and an ejection operation to eject the optical disc, which is placed in the housing, to the outside of the housing; a detecting unit for detecting a state of the insertion operation and the ejection operation of the slot control mechanism; and a control unit for controlling the insertion operation and the ejection operation of the slot control mechanism according to a detection result of the detecting unit; wherein if it is found, based on the detection result of the detecting unit, that there is an error in the insertion operation or the ejection operation of the slot control mechanism, the control unit makes the slot control mechanism execute an failure recovery operation to repeat the insertion operation and the ejection operation alternately for a predetermined amount at a first point of time when the above fact is found; and if it is then found, based on the detection result of the detecting unit, that the insertion operation or the ejection operation of the slot control mechanism has returned to normal, the control unit makes the slot control mechanism execute restoration operation for the predetermined amount after a second point of time when the above fact is found, thereby making the slot control mechanism return to the state at the first point of time; and the control unit then makes the slot control mechanism execute the insertion operation or the ejection operation again.

According to the present invention, reliable insertion operation or ejection operation can be secured.

DETAILED DESCRIPTION OF PREFERRED EMBODIMENTS

An embodiment of the present invention will be explained below in detail with reference to the attached drawings.

(1) Configuration of Optical Disc Apparatus According to this Embodiment

Figure 1:
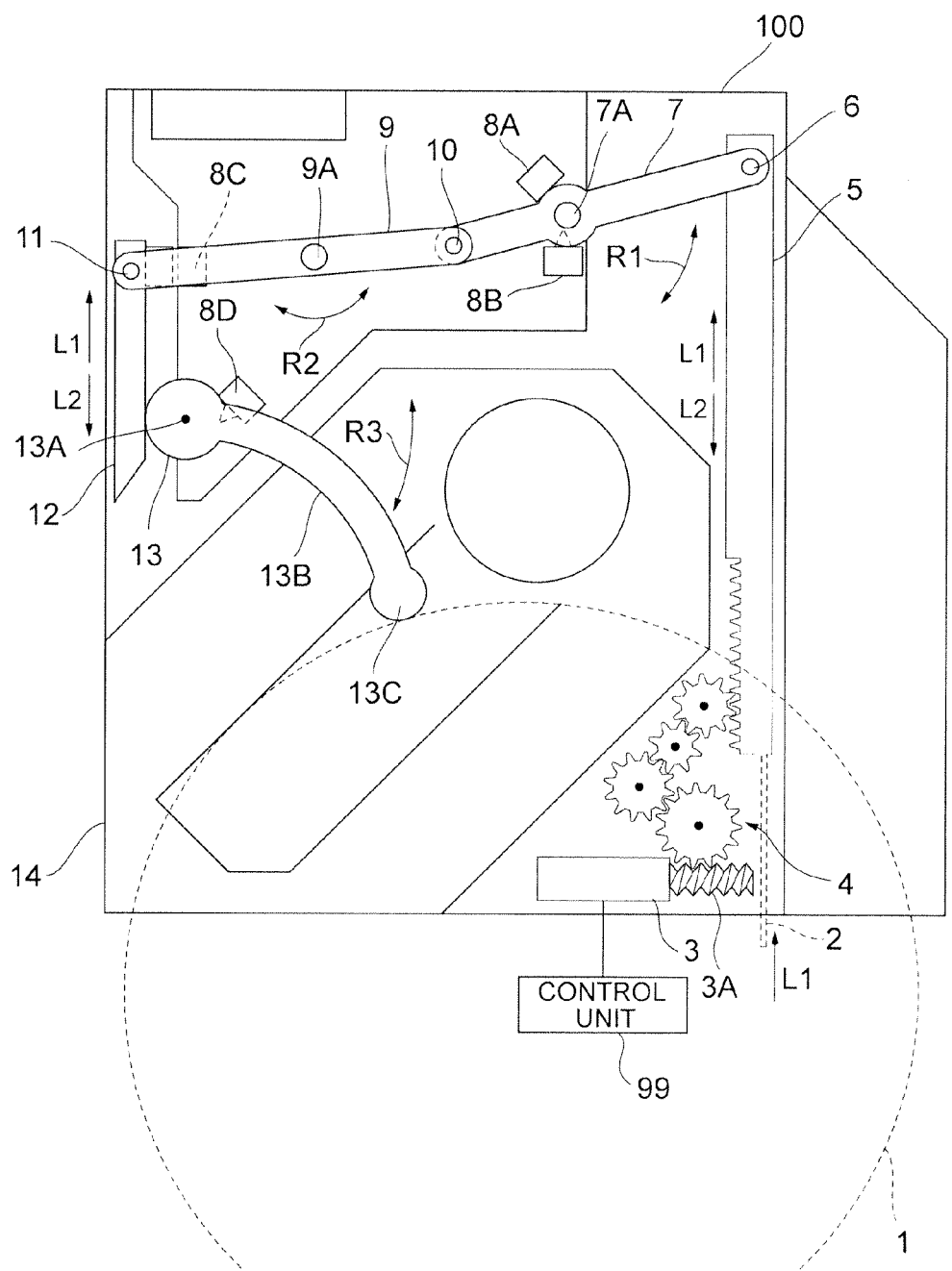
FIG. 1 is a plan view of a configuration example for an optical disc apparatus according to an embodiment of the present invention.

FIG. 1 shows a configuration example for an optical disc apparatus 100 according to this embodiment. The optical disc apparatus 100 includes a housing 14, a slot control mechanism, and a control unit 99. Incidentally, regarding this embodiment, the outline of an optical mechanism, a drive mechanism, and a signal processing unit will be explained; and part of the slot control mechanism that mainly relates to this embodiment will be illustrated in drawings and explained; and diagrammatic representation and explanation of other parts of the slot control mechanism have been omitted.

Firstly, the drive mechanism rotates an optical disc 1 located at a storage completed position under the control of the control unit 99. The optical mechanism irradiates the optical disc 1 with a light beam from a light source under the control of the control unit 99 and performs at least either reading or writing of data from or to the optical disc 1. The signal processing unit controls signal processing with the optical mechanism under the control of the control unit 99. The control unit 99 controls not only the drive mechanism, the optical mechanism, and the signal processing unit, but also the slot control mechanism described below.

The slot control mechanism places the optical disc 1 at the storage completed position in the housing 14 (hereinafter referred to as the "insertion operation") and ejects the optical disc 1 at the storage completed position to outside of the housing 14 (hereinafter referred to as the ejection operation). This slot control mechanism includes a loading motor 3, a transmission mechanism 4, a first element 5, a first lever element 7, a second lever element 9, a second element 12, and a lever 13. When receiving supply of electric power, the loading motor 3 is driven under the control of the control unit 99 and rotates an axis 3A in one direction or the other direction. The first element 5 is an element extending along movement directions (an insertion direction L1 and an ejection direction L2) of the optical disc 1 as caused by the insertion operation or the ejection operation. The transmission mechanism 4 makes the power of the axis 3A act along the movement directions L1 and L2 from one end of the first element 5. As a result, the power is transmitted to the other end of the first element 5.

The first lever element 7 is a lever-shaped element that rotates in R1 directions around a first axis 7A; and one end of the lever-shaped element is mounted via a first joint 6 on the other side of the first element 5. The first lever element 7 transmits the force acting on one end of the lever-shaped element around the first axis 7A to the other end of the lever-shaped element.

The second lever element 9 is a lever-shaped element that rotates in R2 directions around a second axis 9A; and one end of the lever-shaped element is coupled via a second joint 10 to the other end of the second lever element 9; and the force applied to one end of the lever-shaped element is transmitted around the second axis 9A to the other end of the lever-shaped element.

The second element 11 is coupled via a third joint 11 to the other end of the second lever element 9 and moves along the insertion direction L1 and the ejection direction L2 according to the force applied from the other end of the second lever element 9.

The lever 13 has an arm element 13B extending from an axis 13A side and has a top end 13C. The lever 13 is in contact with part of the second element 12; and as the second element 12 moves in the insertion direction L1 and the ejection direction L2, the arm element 13B rotates around the axis 13A in R3 directions. As a result, the top end 13C rotates in the R3 directions in contact with the outer circumference of the optical disc 1, thereby causing the optical disc 1 to move in L1, L2.

The aforementioned housing 14 is provided with first to fourth switches 8A to 8D. These first to fourth switches 8A to 8D are detecting units for detecting positions moved by the insertion operation and the ejection operation. The number of these switch is not limited to four, and as many switches as possible may be provided as long as the same function can be secured.

Each of the first switch 8A and the second switch 8B is provided along the first axis 7A of the first lever element 7 and enters an on or OFF state as caused by the rotation of the first lever element 7. The first lever element 7 is provided with two protruding portions near the axis 7A. Each of these protruding portions operates the first switch 8A and the second switch 8B along with the rotation of the first lever element 7. Incidentally, in this embodiment, the first switch 8A will be also hereinafter referred to as SW1 and the second switch 8B will be also hereinafter referred to as SW2.

The second switch 8B is a switch that is located around the first axis 7A of the first lever element 7 and enters the ON state or the OFF state depending on whether or not part of the first lever element 7 comes into contact with the second switch 8B as a result of the rotation of the first lever element 7. The second switch 8B is a detecting unit for detecting that the optical disc 1 located at the ejection completed position has been pushed for a predetermined amount into the housing 14. If the second switch 8B enters the ON state, the control unit 99 drives the loading motor 3 and starts the insertion operation. The first switch 8A is a detecting unit for detecting that the insertion operation has been started and the first lever element 7 has further rotated for a predetermined amount.

The third switch 8C is provided near the third joint 11 in the housing 14. When the aforementioned second element 12 moves in the insertion direction L1, part of the second element 12 comes into contact with, and operates, the third switch 8C. Incidentally, in this embodiment, the third switch 8C will be also hereinafter referred to as "SW3."

The fourth switch 8D is provided near the axis 13A of the lever 13 in the housing 14. The fourth switch 8D enters the ON state or the OFF state depending on a rotation position of the lever 13 in the R3 directions. The fourth switch 8D is a detecting unit for detecting whether the optical disc 1 has been placed at the storage completed position or not. Incidentally, the fourth switch 8D will be also hereinafter referred to as SW4.

Furthermore, the slot control mechanism may be equipped with an operation element 2 for forcing the optical disc 1, which cannot be taken out by the ejection operation, to be removed out of the housing 14. This operation element 2 may be, for example, a bar-like element extending from outside of the housing 14 to inside thereof; and the bar-like element is configured so that one end of the bar-like element is exposed to outside of the housing 14 so that it can be operated externally, and the other end of the bar-like element comes into contact with part of the first element 5 and can press it into the housing 14. If such a configuration is employed, further reliable ejection operation can be secured.

(2) Disc Tray Storage State

Figure 2:
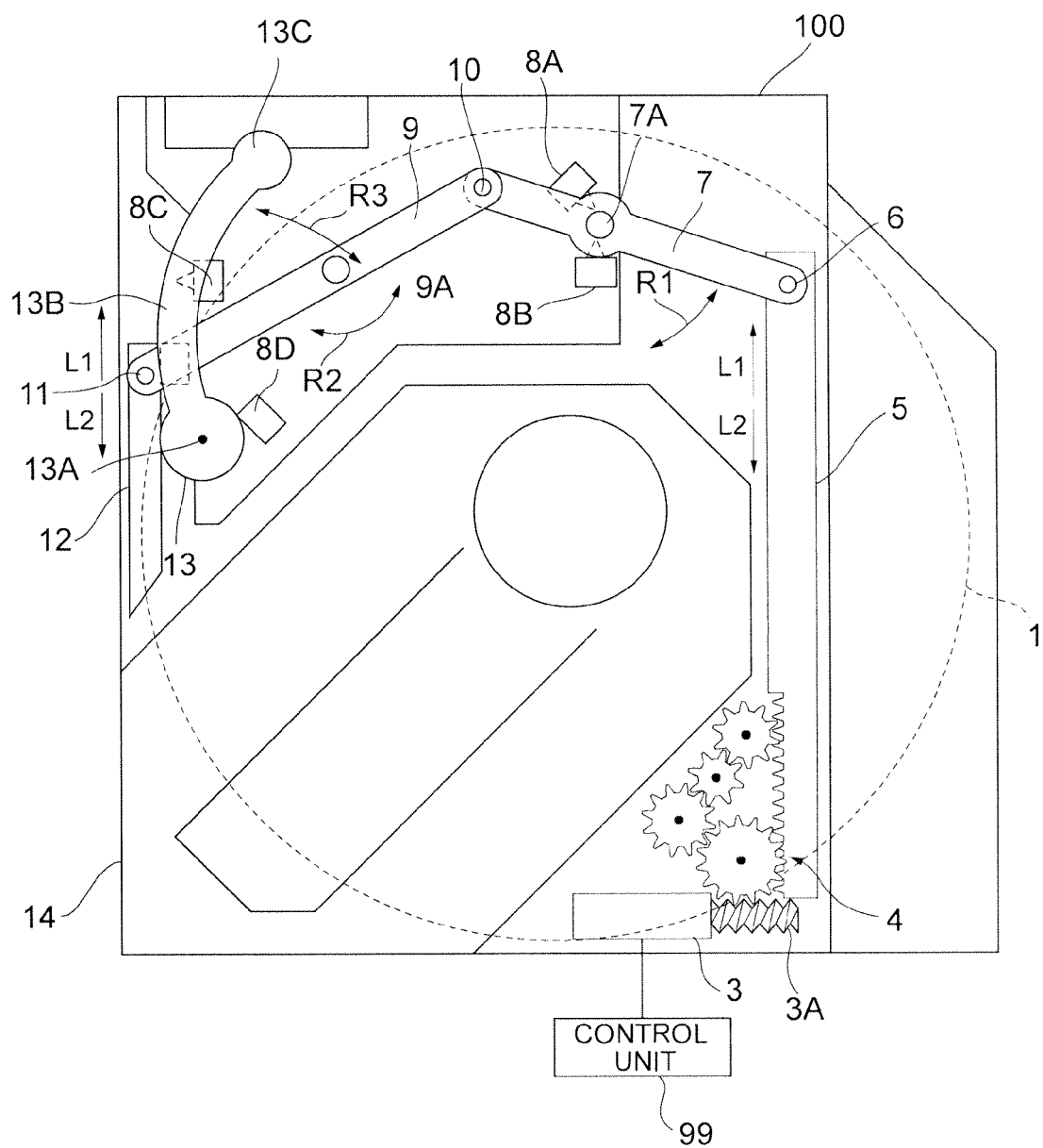
FIG. 2 is a plan view showing a case where a slot control mechanism shown in FIG. 1 operates normally.

FIG. 2 is a plan view showing a case where the slot control mechanism shown in FIG. 1 operates normally. The state shown in FIG. 2 illustrates a state where the optical disc 1 is loaded by the slot control mechanism to reach the storage completed position.

With the optical disc apparatus 100, the optical disc 1 in a state located at the ejection completed position is pushed into the housing 14 to some extent. Then, the second switch 8B changes from the OFF state to the ON state. Incidentally, when the optical disc 1 is located at the ejection completed position, all the first to fourth switches 8A to 8D are in the OFF state.

As the disc tray is pushed into the housing 14 until the second switch 8B enters the ON state, the slot control mechanism starts the insertion operation. Specifically speaking, as triggered by the change of the state of the second switch 8B to the ON state, the control unit 99 drives the loading motor 3, so that the slot control mechanism starts the operation to insert the optical disc 1.

The driving force of the loading motor 3 caused by rotation of the axis 3A is applied by the transmission mechanism 4 to the first element 5. The first element 5 moves in the insertion direction L1 and rotates the first lever element 7 around the first axis 7A in the R1 directions. When the first lever element 7 rotates as described above, the second lever element 9 coupled via the second joint 10 to the first lever element 7 rotates around the second axis 9A. When the second lever element 9 rotates as described above, the second element 12 coupled via the third joint 11 to the second lever element 9 moves in the insertion direction L1. As the second element 12 moves in the insertion direction L1 as described above, the lever 13 in contact with the second element 12 rotates clockwise in the R3 direction.

As a result, the optical disc 1 is loaded in the insertion direction L1 by the slot control mechanism and moves to the storage completed position. When the optical disc 1 enters this state, the aforementioned third and fourth switches 8C, 8d make the transition to a specified state described later. The on or OFF state of each switch 8A to 8D will be explained later.

(3) Slot Control Processing

Figure 3:
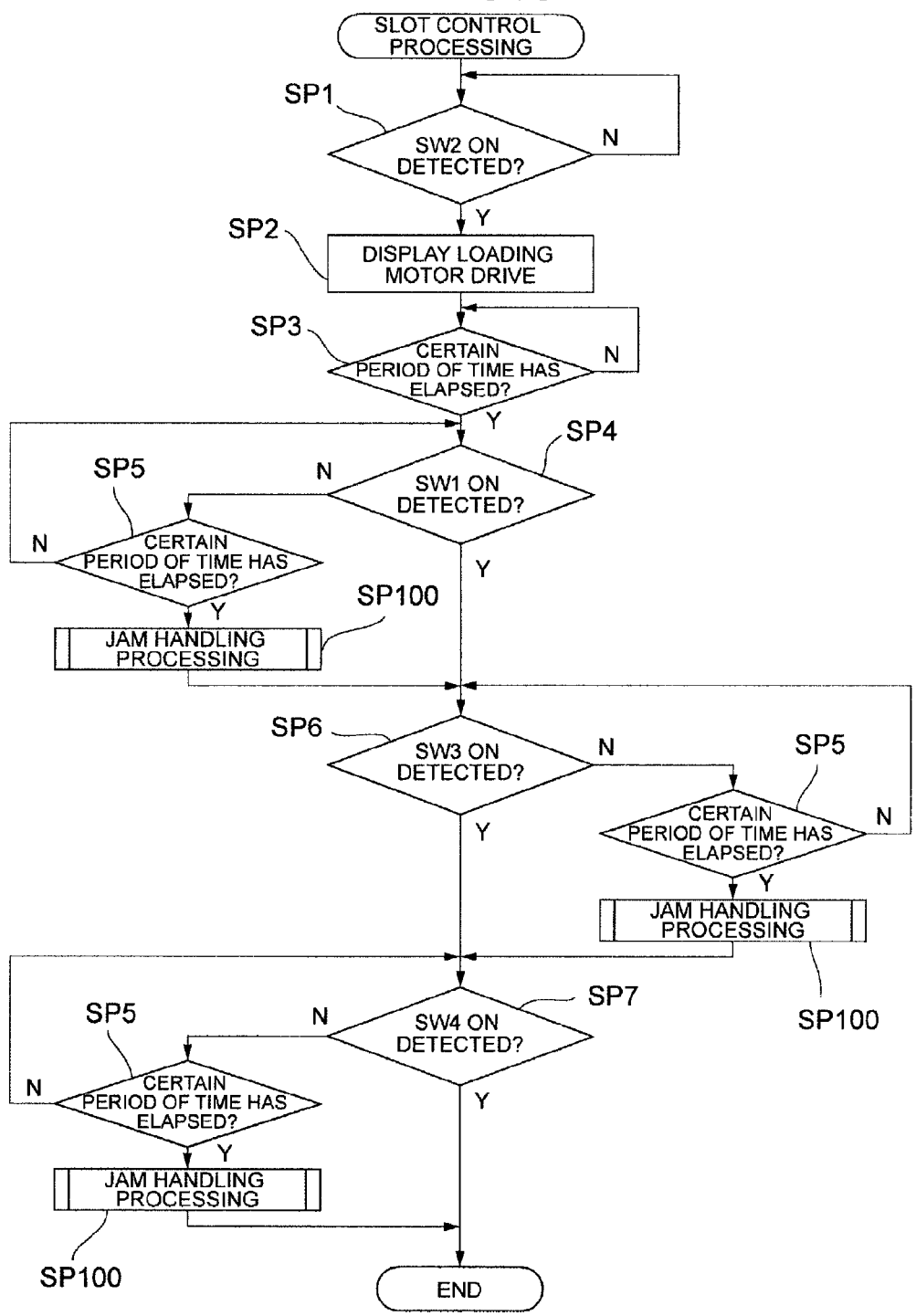
FIG. 3 is a flowchart illustrating an example of slot control processing.

FIG. 3 shows an example of a processing sequence for slot control processing. The slot control processing will be explained with reference to FIG. 1 and FIG. 2 described above as necessary. Firstly, the insertion operation will be explained.

(3-1) Disk Insertion Standby State

The optical disc apparatus 100 is in a disk insertion standby state of waiting for the optical disc 1 to be inserted. The optical disc apparatus 100 is configured so that as the optical disc 1 located at the ejection completed position is pushed for a predetermined amount into the housing 14, the top end 13C of the lever 13 in contact with the outer circumference of the optical disc 1 rotates counterclockwise in the R3 direction. As a result, the second element 12 in contact with part of the lever 13 moves in the insertion direction L1. As the result of the movement of the second element 12, the first lever element 7 rotates for a predetermined amount in the R1 direction via the second lever element 9 coupled via the second element 12. When the first element 5 has rotated for a predetermined amount in the R1 direction as described above, the aforementioned second switch 8B firstly changes from the OFF state to the ON state.

The control unit 99 executes standby processing until the second switch 8B changes from the OFF state to the ON state as described above (SP1). When the second switch 8B enters the ON state, the control unit 99 gives a command to drive the loading motor 3 (SP2) and executes the standby processing until a certain period of time has elapsed (SP3).

(3-2) Detection of Driving Start Position of Loading Motor

Next, the control unit 99 judges whether or not a change of the state of the first switch 8A (corresponding to SW1 in the drawing) from the OFF state to the ON state is detected (SP4). The first switch 8A enters the ON state when the first lever element 7 further rotates in the R1 direction as a result of further loading of the optical disc 1 into the housing 14 by driving the aforementioned loading motor 3.

If the control unit 99 detects that the first switch 8A has entered the ON state, the control unit 99 executes step SP6 described below. On the other hand, if the control unit 99 fails to detect the ON state of the first switch 8A, the control unit 99 judges whether a certain period of time has elapsed or not (SP5); and attempts to detect if the first switch 8A has entered the ON state within the certain period of time. However, if the control unit 99 fails to detect that the first switch 8A has entered the ON state within the certain period of time, the control unit 99 executes jam handling processing described later (SP100). Incidentally, a point of time when it is found that there is an error in the insertion operation (that is, a point of time when the jam handling processing is executed) corresponds to a first point of time described later.

Next, in step SP6, the control unit 99 judges whether a change of the state of the third switch 8C (corresponding to SW3 in the drawing) from the OFF state to the ON state is detected. The third switch 8C changes from the OFF state to the ON state when the second element 12 further moves in the insertion direction L1 as a result of further loading of the optical disc 1 into the housing 14 by driving the loading motor 3.

If the control unit 99 detects the ON state of the third switch 8C, it executes step SP7 described later. On the other hand, if the control unit 99 fails to detect the ON state of the third switch 8C, the control unit 99 judges whether a certain period of time has elapsed or not (SP5). The control unit 99 attempts to detect if the first switch 8A has entered the ON state within the certain period of time. However, if the control unit 99 fails to detect that the third switch 8C has entered the ON state within the certain period of time, the control unit 99 executes the jam handling processing described later (SP100). Incidentally, the point of time when it is found that there is an error in the insertion operation (that is, the point of time when the jam handling processing is executed) corresponds to the first point of time described later.

(3-3) Detection of Storage Completed Position

Next, in step SP7, the control unit 99 judges whether a change of the state of the fourth switch 8D (corresponding to SW4 in the drawing) from the OFF state to the ON state is detected (SP7). The fourth switch 8D enters the ON state when the top end 13C of the lever 13 further rotates in the R3 direction as a result of further loading of the optical disc 1 into the housing 14 by driving the loading motor 3.

If the control unit 99 detects the ON state of the fourth switch 8D, it terminates the slot control processing. On the other hand, if the control unit 99 fails to detect the ON state of the fourth switch 8D, the control unit 99 judges whether a certain period of time has elapsed or not (SP5). The control unit 99 attempts to detect if the fourth switch 8D has entered the ON state within the certain period of time. However, if the control unit 99 fails to detect that the fourth switch 8D has entered the ON state within the certain period of time, the control unit 99 executes the jam handling processing described later (SP100). Incidentally, the point of time when it is found that there is an error in the insertion operation (that is, the point of time when the jam handling processing is executed) corresponds to the first point of time described later.

In this embodiment, the slot control mechanism executes not only the aforementioned insertion operation, but also the ejection operation by executing each of the processing steps in reverse order. An explanation of the ejection operation has been omitted because the ejection operation is almost the same as the insertion operation, except that the order is reversed.

(3-4) Jam Handling Processing

Figure 4:
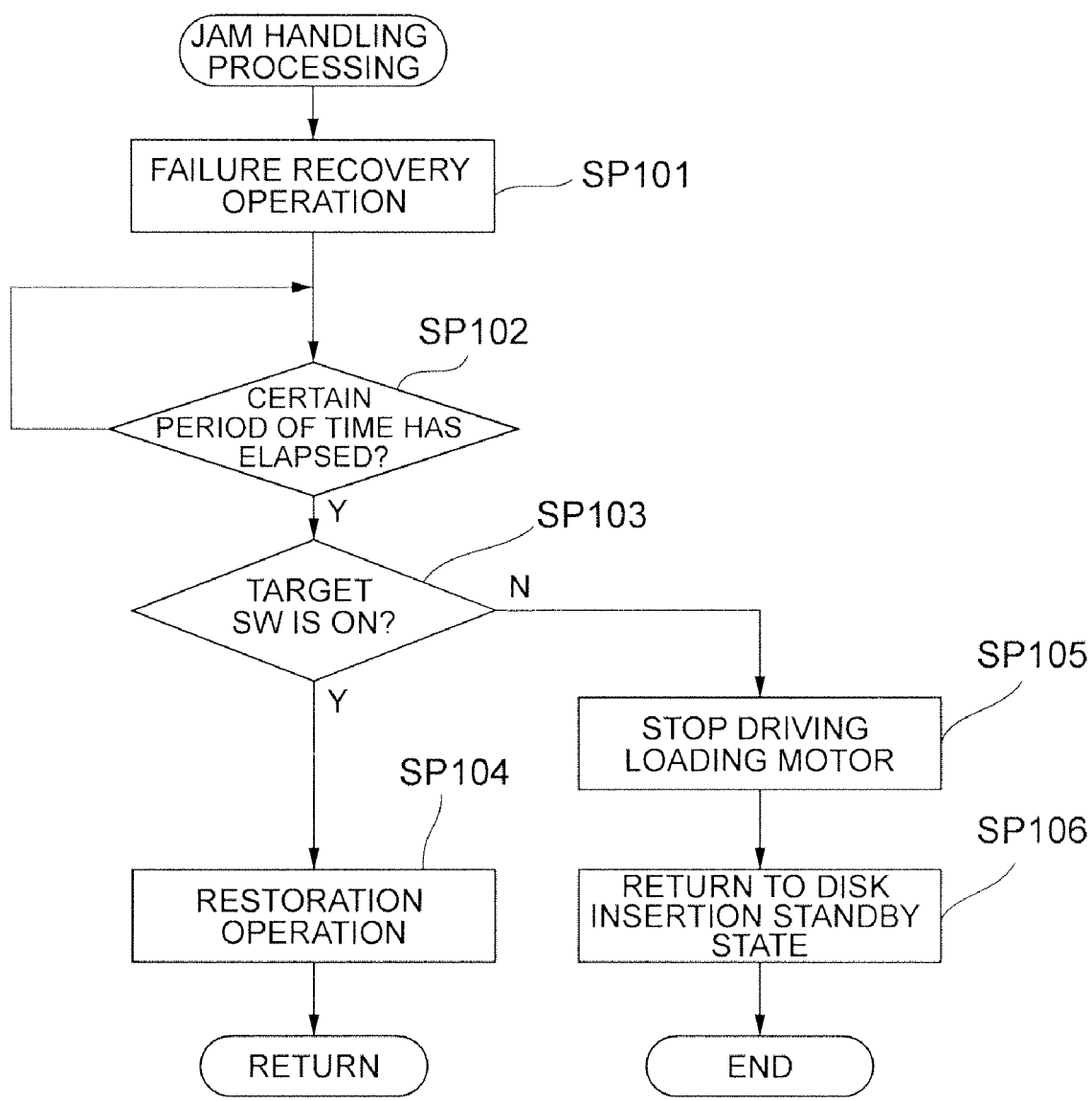
FIG. 4 is a flowchart illustrating an example of a specific processing sequence for jam handling processing.

FIG. 4 shows an example of a specific processing sequence for the jam handling processing. This jam handling processing is executed when the situation occurs where the slot control mechanism can no longer continue the insertion operation (or the ejection operation) of the optical disc 1 during the execution thereof for any reason.

At the first point of time when it is found that there is an error in the insertion operation of the slot control mechanism as described above, the control unit 99 makes the slot control mechanism execute failure recovery operation. This failure recovery operation is executed by the control unit 99 to repeat the insertion operation and the ejection operation alternately for a predetermined amount. Specifically speaking, for example, the control unit 99 applies a driving voltage of a specified pulse described later to the loading motor 3 and causes, for example, a predetermined amount of normal rotation or reverse rotation (SP101). After the execution of such failure recovery operation, the control unit 99 waits until a certain period of time has elapsed (SP102); and the control unit 99 then attempts to detect if a target switch from among the first to fourth switches 8A to 8D has entered the ON state (SP103). The target switch herein mentioned means a switch based on which the control unit 99 has determined that the jam handling processing should be executed, and which should have entered the ON state. Incidentally, a point of time when it is found that the insertion operation has returned to normal corresponds to a second point of time.

If the control unit 99 detects that the target switch has entered the ON state (SP103), that is, if the insertion operation or the ejection operation of the slot control mechanism has returned to normal, the control unit 99 makes the slot control mechanism execute restoration operation for the above predetermined amount after the second point of time. Specifically speaking, the control unit 99 supplies the predetermined amount of driving current to the loading motor 3, thereby causing the predetermined amount of reverse rotation or normal rotation (SP104). Specifically, the control unit 99 supplies driving power, which is equivalent to the predetermined amount of the driving power given after the first point of time during the above failure recovery operation to the loading motor 3 of the slot control mechanism, to the loading motor 3 after the second point of time during this restoration operation. Subsequently, the control unit 99 makes the slot control mechanism return to the state of the above first point of time and then makes the slot control mechanism execute the insertion operation or the ejection operation. That is, the control unit 99 returns control to each of the processing steps for executing the jam handling processing (in FIG. 3) and starts executing each processing step in continuation with the step at the first point of time. As a result, even if the execution of the failure recovery operation has caused, for example, the switch 8B to enter an unintended state, it is possible make it return to the original state.

On the other hand, if the control unit 99 fails to detect that the target switch has entered the ON state (SP103), it determines that the slot control mechanism has not return to normal; and stops supplying the driving power to the loading motor 3 (SP105) and makes the slot control mechanism return to the disk insertion standby state of waiting to receive the optical disc 1 (SP106).

(4) On-Off Timing of Each Switch during Normal Operation

Figure 5:
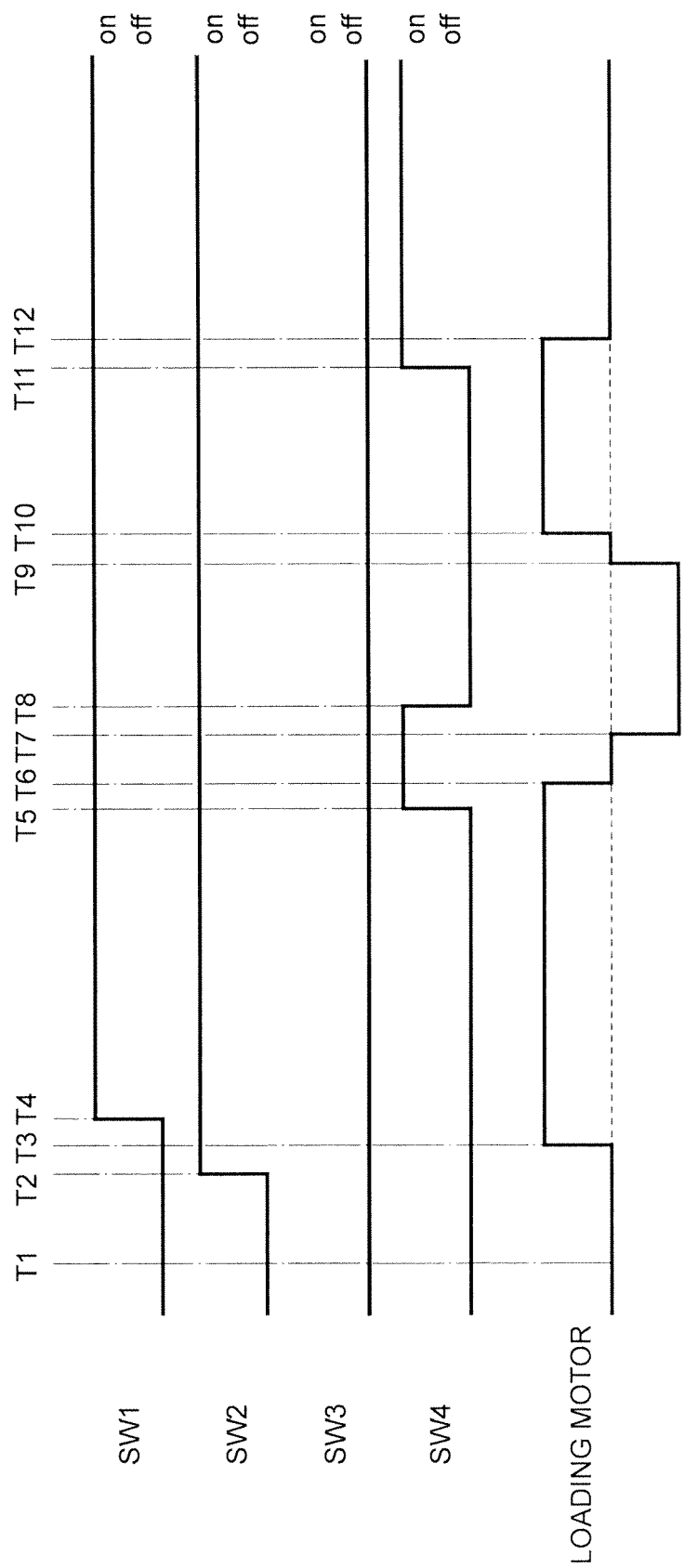
FIG. 5 is a timing chart showing the on/off state timing of each switch.
Figure 6:
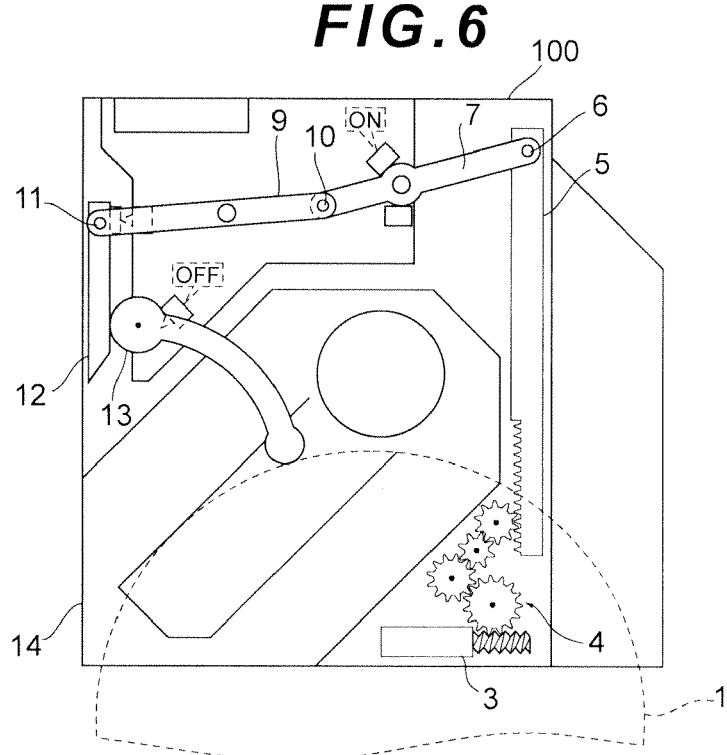
FIG. 6 is a plan view showing an operation example for the slot control mechanism.

FIG. 5 shows on-off timing of the first to fourth switches 8A to 8D. The example shown in the drawing illustrates an example of the insertion operation and shows on-off timing of the first switch 8A (SW1), the second switch 8B (SW2), the third switch 8C (SW3), the fourth switch 8D (SW4), and the loading motor 3 in descending order from the top. Incidentally, each of FIG. 6 to FIG. 9 shows an operation example for, for example, the slot control mechanism At the timing T1, T2, T3, T4 in FIG. 5.

At the timing T1 shown in the drawing, the optical disc apparatus 100 is in the disk insertion standby state and waits for the optical disc 1 to be inserted into the housing 14. When the optical disc 1 is inserted into the housing from this disk insertion standby state, it enters a state shown in FIG. 6. This state corresponds to the state shown in FIG. 1. The optical disc 1 is pushed into the housing 14 in this state.

At the timing T2, with the optical disc 1 being pushed into the housing 14 a predetermined amount, it is thereby detected that the second switch 8B has changed from the OFF state to the ON state. The control unit 99 receives a detection signal from the second switch 8B. At the timing T3, the control unit 99 starts supplying a driving voltage to the loading motor 3.

Figure 7:
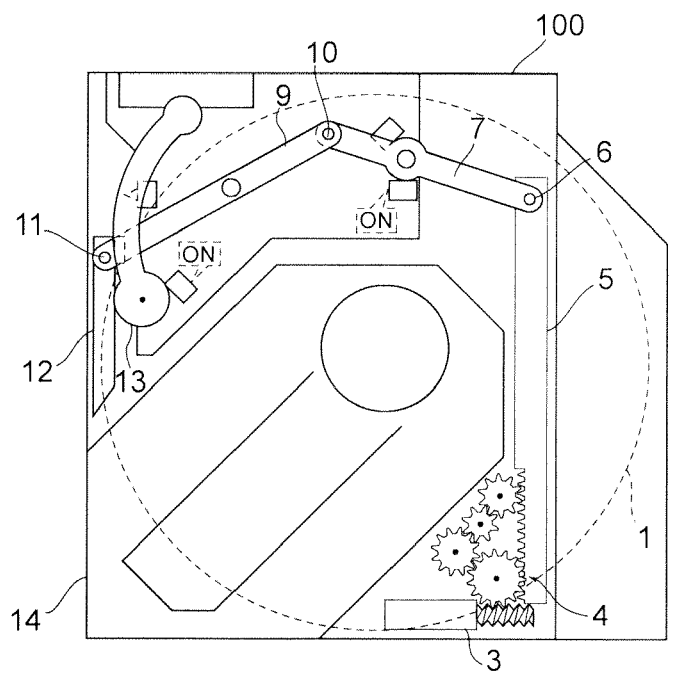
FIG. 7 is a plan view showing an operation example for the slot control mechanism.

Next, At the timing T4, such driving of the loading motor 3 activates the slot control mechanism and it is shown that the first switch 8A has changed from the OFF state to the ON state. If the optical disc 1 is further loaded from this state, the optical disc 1 enters a state of being inserted all the way into the housing 14 as shown in FIG. 7. This state continues until timing T5. At this timing T5, the fourth switch 8D changes from the ON state to the OFF state. As a result, the control unit 99 recognizes, based on a detection signal from the fourth switch 8D, that the optical disc 1 is in the state of being inserted all the way into the housing 14.

Figure 8:
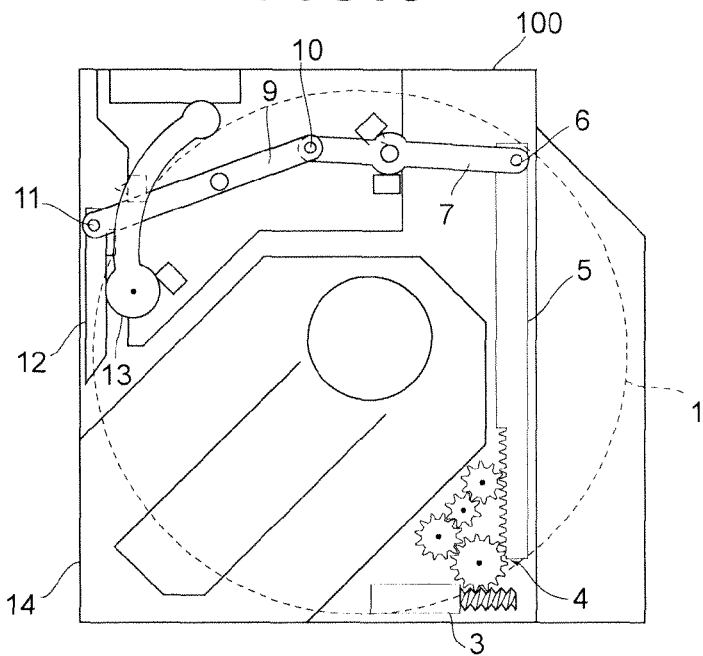
FIG. 8 is a plan view showing an operation example for the slot control mechanism.

At the timing T6, the control unit 99 stops driving the loading motor 3. At the timing T7, the control unit 99 drives the loading motor 3 to cause reverse rotation of the loading motor 3. At the timing T8, the fourth switch 8D enters the ON state. After receiving the detection signal from the fourth switch 8D, the control unit 99 recognizes that the optical disc 1 is located at the ejection completed position. Then, At the timing T9, the control unit 99 stops driving the loading motor 3. In this state, the optical disc 1 is located at the ejection completed position as shown in FIG. 8.

Figure 9:
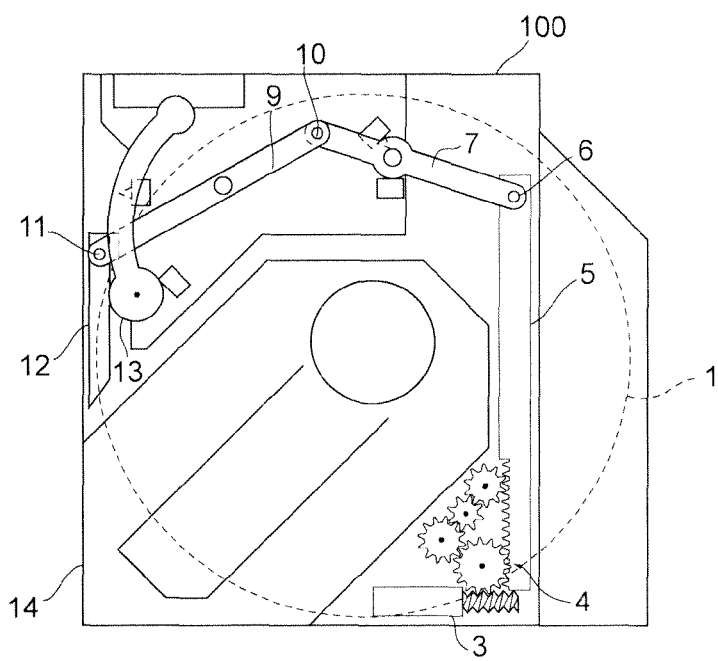
FIG. 9 is a plan view showing an operation example for the slot control mechanism.

Next, the control unit 99 drives the loading motor 3 again At the timing T10 and the fourth switch 8D enters the OFF state At the timing T11. After receiving the detection signal from the fourth switch 8D, the control unit 99 stops driving the loading motor 3 At the timing T12. In this state, the optical disc 1 is located at the storage completed position and the lever 13 is located at a specified standby position as shown in FIG. 9.

(5) On-Off timing of Each Switch at the Time of Occurrence of Failure

Figure 10:
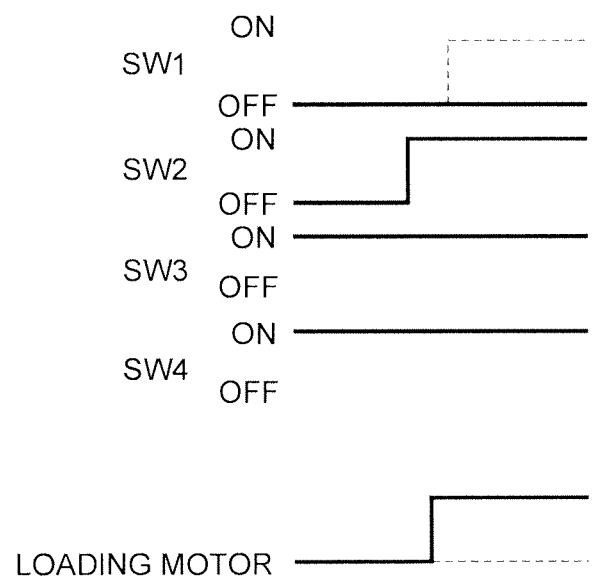
FIG. 10 is a timing chart showing the on-off timing of, for example, switches at the time of the failure occurrence.

FIG. 10 to FIG. 13 are waveform charts for explaining on-off timing of, for example, each switch at the time of occurrence of a failure. If the first switch 8A does not change from the OFF state to the ON state as indicated with a dashed line for SW1 in FIG. 11 even after the elapse of a certain period of time since the second switch 8B entered the ON state and the control unit 99 started driving the loading motor 3 as shown in FIG. 10, the failure recovery operation described earlier is executed.

Figure 11:
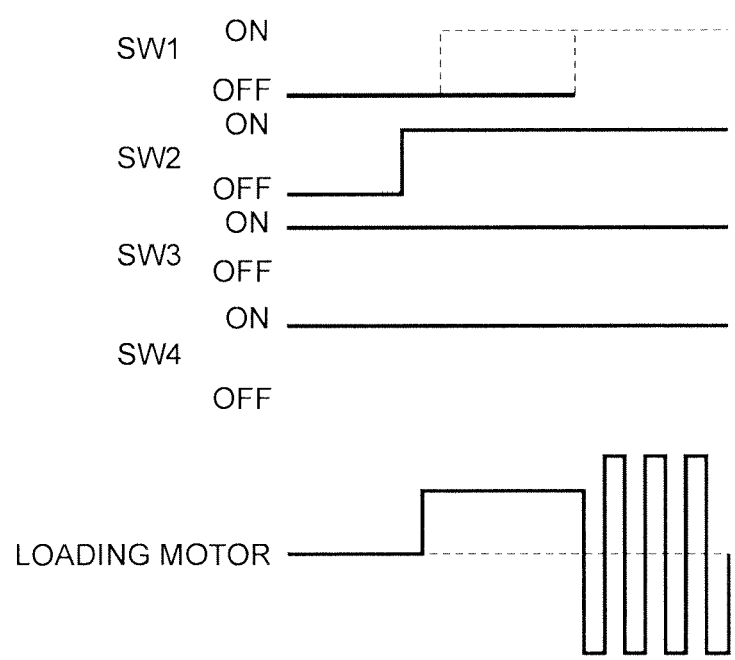
FIG. 11 is a timing chart showing the on-off timing of, for example, the switches at the time of the failure occurrence.

In this failure recovery operation, the control unit 99 supplies pulses to the loading motor 3 to cause normal rotation and pulses to cause reverse rotation, for example, at a maximum voltage of 30 ms pulse width as necessary time for the slot control mechanism to is slightly operated (corresponding to the right side of a waveform relating to the loading motor in FIG. 11).

Figure 12:
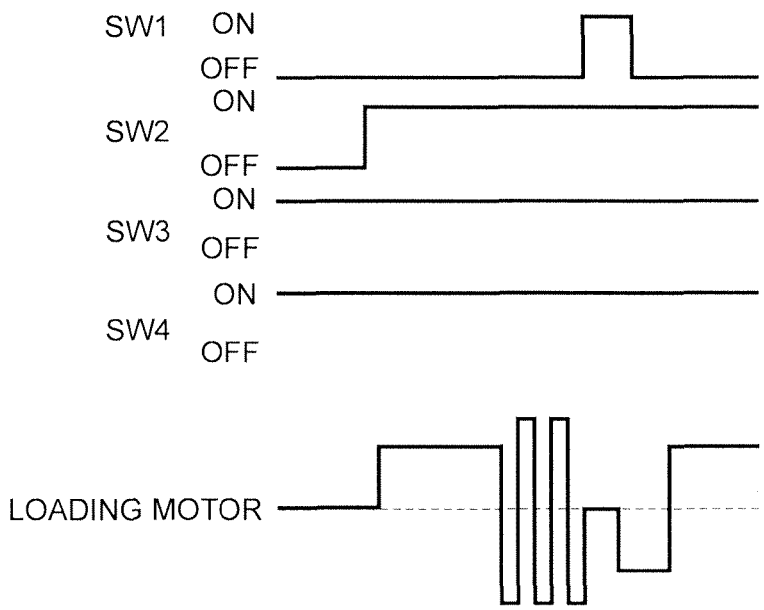
FIG. 12 is a timing chart showing the on-off timing of, for example, the switches at the time of the failure occurrence.

As a result, if the slot control mechanism returns to the normal state, the first switch 8A temporarily enters the ON state as shown in FIG. 12. In this case, the control unit 99 temporarily causes reverse rotation of the loading motor 3 to redo the slot control processing sequence, executes the ejection operation, and makes the first switch 8A return to the OFF state. If the optical disc 1 is made to return to the ejection completed position in this way, the control unit 99 supplies the driving voltage to the loading motor 3 again. It should be noted that the optical disc 1 is made to temporally return to the ejection completed position once because an unintended operation of the switches might be caused by the aforementioned failure recovery operation and such the state is necessary to be initialized.

Figure 13:
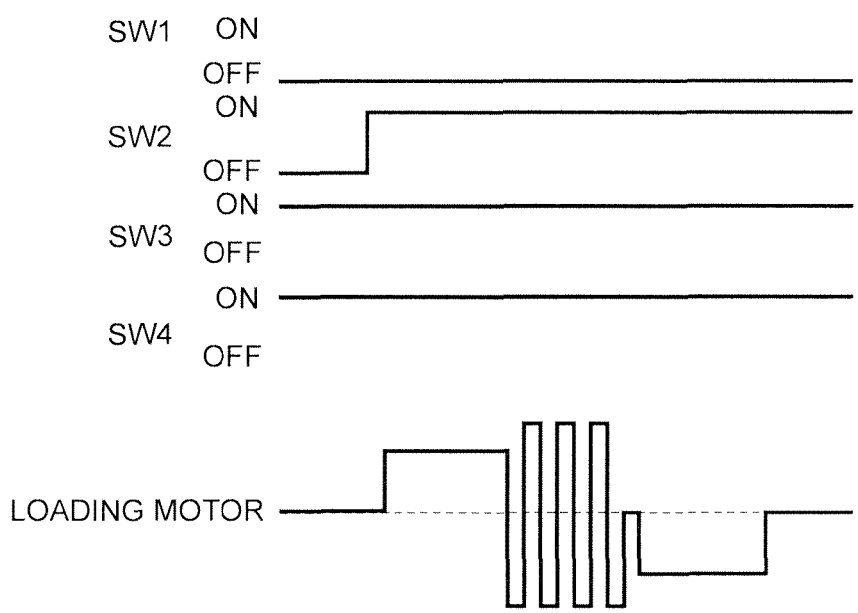
FIG. 13 is a timing chart showing the on-off timing of, for example, the switches at the time of the failure occurrence.

On the other hand, if the slot control mechanism does not return to the normal state, the first switch 8A does not enter the ON state as shown in FIG. 13. In this case, the control unit 99 drives the loading motor 3 to reversely rotate for the amount driven during the failure recovery operation, and then stops the loading motor 3. In other words, the control unit 99 stops the entire operation of the slot control mechanism. Incidentally, the insertion operation has been taken as an example in the above explanation; however, the ejection operation can be also realized by almost the same procedures, except the order of the processing steps for the insertion operation is reversed for the ejection operation.

(6) Advantageous Effects of This Embodiment

With the optical disc apparatus 100 according to the above embodiment as described above, if it s found based on the detection result by, for example, each switch 8A serving as the detecting unit that there is an error in the insertion operation or the ejection operation of the slot control mechanism, the control unit 99 makes the slot control mechanism execute the failure recovery operation to repeat the insertion operation and the ejection operation alternately for a predetermined amount at the first point of time when the above fact is found. Subsequently, if it is found based on the detection result of, for example, each switch 8A that the insertion operation or the ejection operation of the slot control mechanism has returned to normal, the control unit 99 makes the slot control mechanism execute the restoration operation for the predetermined amount after the second point of time when the above fact is found, thereby making the slot control mechanism return to the state at the first point of time; and then the control unit 99 makes the slot control mechanism execute the insertion operation or the ejection operation again.

If such a configuration is employed, even if a minor failure occurs, it is possible to recover from the failure and secure at least either reliable insertion operation or ejection operation. Furthermore, the optical disc apparatus 100 can return to the first point of time when it was found that the failure occurred in the slot control mechanism; and can make the slot control mechanism to the state at the first point of time and then drive the slot control mechanism. Therefore, it is unnecessary to resume the operation of the slot control mechanism from an unintended state.

Moreover, in this embodiment, the control unit 99 supplies the driving power equivalent to the predetermined amount of driving power, which was given after the first point of time during the failure recovery operation to the loading motor 3 of the slot control mechanism, to the loading motor 3 after the second point of time during the restoration operation. As a result, even if, for example, the switch 8B has entered an unintended state due to the execution of the failure recovery operation, it is possible to make it return to the original state.

Furthermore, in this embodiment, the slot control mechanism includes: the first element 5 extending along the movement direction of the optical disc 1 as caused by the insertion operation or the ejection operation; the transmission mechanism 4 for transmitting the driving force of the loading motor 3 from one end of the first element 5 to the other end of the first element 5 by making the driving force act along the movement directions L1 and L2; the first lever element 7 that is a lever-shaped element which rotates around the first axis 7A, and whose one end is coupled via the first joint 6 to the other end of the first element 7, so that the force applied to one end of the lever-shaped element is transmitted around the first axis 7A to the other end of the lever-shaped element; the second lever element 9 that is a lever-shaped element which rotates around the second axis 10, and whose one end is coupled via the second joint 10 to the other end of the second lever element 9, so that the force applied to one end of the lever-shaped element is transmitted around the second axis 10 to the other end of the lever-shaped element; the second element 12 which is coupled via the third joint to the other end of the second lever element 9 and moves along the movement directions L1 and L2; and the lever 13 which is in contact of the second element 12 and rotates as caused by the movement of the second element 12, so that a top end of the lever 13 moves the optical disc 1 along the movement directions L1 and L2.

With this arrangement, it is possible to ensure reliable insertion operation or ejection operation on the optical disc apparatus 100, even if the slot control mechanism is configured as described above.

Furthermore, in this embodiment, the second switch 8B is a switch which is located around the first axis 7A of the first lever element 7 and enters the ON state or the OFF state depending on whether or not part of the first lever element 7 comes into contact with the second switch 8B as caused by the rotation of the first lever element 7.

Also, in this embodiment, after the execution of the failure recovery operation, the control unit 99 determines that the slot control mechanism has not returned to normal based on the detection result of the switch 8A etc., stops supplying the driving power to the loading motor 3; and makes the slot control mechanism return to the disk insertion standby state of waiting to receive the optical disc 1.

(7) Other Embodiments

The above embodiment is an example given for the purpose of describing the present invention, and it is not intended to limit the invention only to these embodiment. Accordingly, the present invention can be utilized in various ways unless the utilizations depart from the gist of the invention. For example, processing sequences of various programs have been explained sequentially in the embodiment described above; however, the order of the processing sequences is not particularly limited to that described above. Therefore, unless any conflicting processing result is obtained, the order of processing may be rearranged or concurrent operations may be performed. On an aside, the aforementioned embodiment mainly describes a case where the present embodiment is applied to the insertion operation, however, the present embodiment can be applied to the ejection operation as well except the processing order is opposite.

What is claimed is:

1. An optical disc apparatus for performing at least either reading or writing of data from or to an optical disc, the optical disc apparatus comprising:
    a housing;
    a slot control mechanism for executing an insertion operation to place the optical disc from an outside to an inside of the housing and an ejection operation to eject the optical disc, which is placed in the housing, to the outside of the housing;
    a detecting unit for detecting a state of the insertion operation and the ejection operation of the slot control mechanism; and
    a control unit for controlling the insertion operation and the ejection operation of the slot control mechanism based on a detection result of the detecting unit;
    wherein if it is found, based on the detection result of the detecting unit, that there is an error in the insertion operation or the ejection operation of the slot control mechanism, the control unit makes the slot control mechanism execute an failure recovery operation to repeat the insertion operation and the ejection operation alternately for a predetermined amount at a first point of time when the above fact is found; and
    if it is then found, based on the detection result of the detecting unit, that the insertion operation or the ejection operation of the slot control mechanism has returned to normal, the control unit makes the slot control mechanism execute restoration operation for the predetermined amount after a second point of time when the above fact is found, thereby making the slot control mechanism return to the state at the first point of time; and the control unit then makes the slot control mechanism execute the insertion operation or the ejection operation again.

2. The optical disc apparatus according to claim 1, wherein the control unit supplies driving power equivalent to the predetermined amount of driving power, which is given to a loading motor of the slot control mechanism after the first point of time during the failure recovery operation, to the loading motor after the second point of time during the restoration operation.

3. The optical disc apparatus according to claim 1, wherein the slot control mechanism includes:
    a first element extending in a movement direction of the optical disc as caused by the insertion operation or the ejection operation;
    a transmission mechanism for transmitting driving force of the loading motor from one end of the first element to the other end of the first element by performing the driving force act along the movement direction;
    a first lever element that is a lever-shaped element rotating around a first axis, one end of the lever-shaped element being coupled via a first joint to the other end of the first element, so that force applied to one end of the lever-shaped element is transmitted around the first axis to the other end of the lever-shaped element;
    a second lever element that is a lever-shaped element rotating around a second axis, one end of the lever-shaped element being coupled via a second joint to the other end of the first lever element, so that force applied to one end of the lever-shaped element is transmitted around the second axis to the other end of the lever-shaped element;
    a second element that is coupled via a third joint to the other end of the second lever element and moves along the movement direction; and
    a lever that is in contact with the second element and rotates as caused by the movement of the second element, so that a top end of the lever moves the optical disc along the movement direction.

4. The optical disc apparatus according to claim 3, wherein the detecting unit is a switch which is located around the first axis of the first lever element and enters an on state or off state according to whether or not part of the first lever element comes into contact with the detecting unit as caused by rotation of the first lever element.

5. The optical disc apparatus according to claim 3, wherein after the execution of the failure recovery operation, the control unit
    determines that the slot control mechanism has not returned to a normal state based on the detection result of the detecting unit,
    stops supplying the driving power to the loading motor; and
    makes the slot control mechanism return to a disk insertion standby state which is a state of waiting to receive the optical disc.

* * * * *